Nov. 2, 1948.    C. L. PAULUS ET AL    2,452,599
CONTROL SYSTEM FOR TARGET AIRCRAFT
Filed July 9, 1943
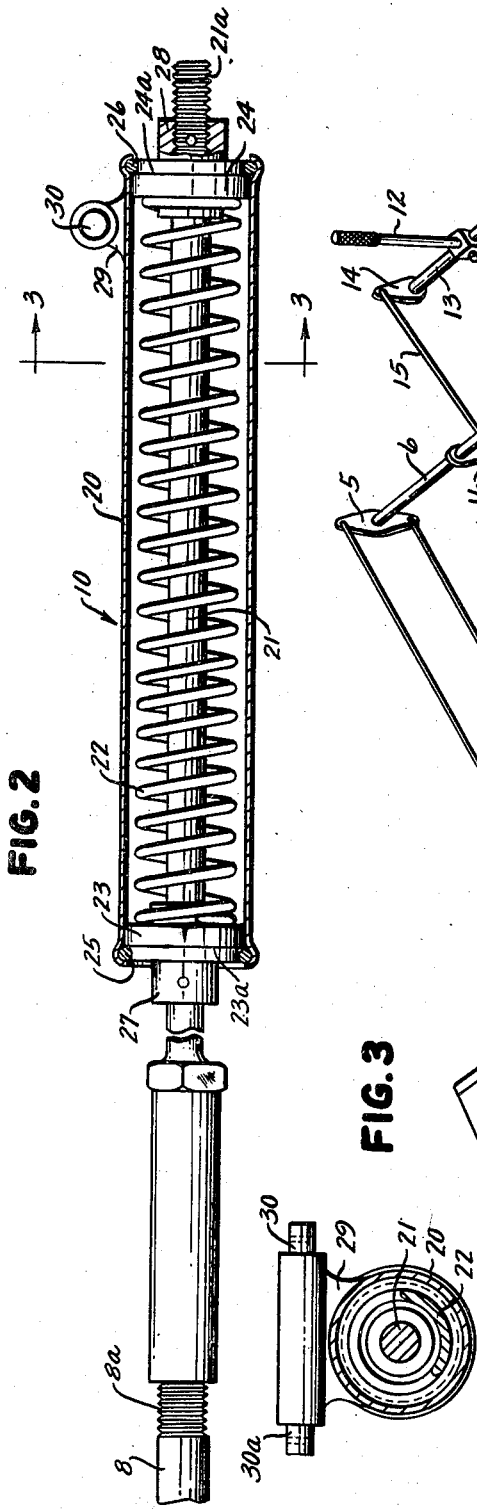
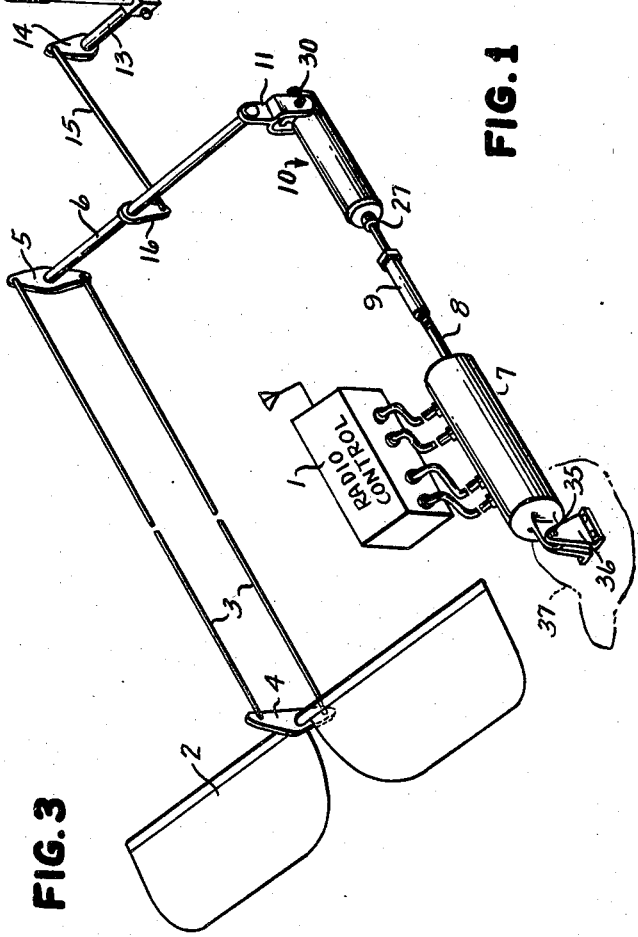
INVENTORS
CHARLES L. PAULUS
HOWARD A. KLEIN
BY
ATTORNEYS Patented Nov. 2, 1948

2,452,599

UNITED STATES PATENT OFFICE 2,452,599

CONTROL SYSTEM FOR TARGET AIRCRAFT

Charles L. Paulus, Dayton, Ohio, and Howard A. Klein, Oakdale, Pa.

Application July 9, 1943, Serial No. 494,029

3 Claims. (Cl. 74—480)

(Granted under the act of March 3, 1883, as amended April 30, 1928; 370 O. G. 757)

The invention described herein may be manufactured and used by or for Government for governmental purposes, without the payment to us of any royalty thereon.

This invention relates to control systems for aircraft and more particularly to a control system designed for application to target aircraft normally adapted for remote control by radio from a controlling airplane.

Target airplanes of comparatively small size and relatively inexpensive construction are commonly employed in the training of flying combat personnel in target gunnery practice under simulated aerial combat conditions wherein the target airplane is designed to be remotely controlled in flight by means of radio control from a control airplane so that the target airplane can be utilized as a gunnery target and maneuvered in flight, for this purpose, without the use of a human pilot. In some cases, however, it is necessary to employ a human or safety pilot in the target airplane for the purpose of checking the functioning of the controls and equipment preliminary to flying the target airplane without any human pilot aboard. The situation of the human or safety pilot riding in the target airplane is extremely hazardous on account of the fact that the operation of the target airplane is under the control of the radio signal emanating from the control airplane and consequently the safety of the human pilot riding in the target airplane rests upon the ability of the control pilot to properly maneuver the target airplane from his remote position to speedily cope with hazardous conditions suddenly encountered by the target airplane.

In the light of the foregoing the primary object of the invention is to provide a control system for the target airplane which will enable the human pilot riding therein to overpower or limit the effect of the remote or radio control upon the target airplane.

It is a further object of the invention to provide a control means for target aircraft wherein the remote control means may be instantly overpowered by the human pilot and yet wherein the remote control means is capable of immediate automatic restoration to its original controlling status upon relinquishment of manual control by the human pilot riding in the target airplane.

Toward the accomplishment of the foregoing objects, the invention contemplates the provision of a dual control system comprising a plurality of separately operable control means, each of which control means is associated with a controllable member for actuation thereof, and overpower means interposed between one of said control means and said controllable means, said overpower means being operative to permit actuation of the controllable means independently of said one of said control means upon operation of the other of said control means.

The overpower means constitutes a flexible or yieldable force transmitting means designed particularly to be incorporated in the control system of a target airplane such as may be employed for controlling the actuation of one of the control surfaces of such airplane. For this purpose, the invention contemplates the provision of a dual-control system including a radio or remote control means associated with the control surface for normally controlling actuation thereof, and a separate manual control means associated with said control surface for alternatively controlling actuation thereof. In such a dual-control system the invention contemplates the interposition of the overpower means between the radio or remote-control means and the control surface in such a manner that the overpower means constitutes a flexible or yieldable connection capable of transmitting the required force to the control surface for actuation thereof under the control of the radio or remote-control means, under normal conditions, and said overpower means being capable of yielding upon actuation of the separately operable manual control means to permit the latter to effect actuation of the control surface independently of the operation of the radio or remote-control means.

Other objects, advantages and features of novelty will appear as the description of the invention proceeds in conjunction with the accompanying drawings, in which Figure 1 is an isometric schematic view illustrating the invention as applied to a control system for one of the control surfaces of a target airplane.

Figure 2 is a longitudinal sectional view through the overpower device of the invention.

Figure 3 is a transverse sectional view through said overpower device taken on the line 3—3 of Figure 2, looking in the direction of the arrows.

Now referring to the drawings for a detailed description of the invention, the numeral 1 generally designates an automatic or radio controlled pilot means which is adapted through intermediate actuating means to control the operation of a controllable means adapted to affect the flight operation of the target airplane, such controllable means, for instance, including the control surfaces of the airplane such as the elevator, ailerons, rudder, and wing flaps. In the embodiment of the invention illustrated, the radio or remote control means 1 is adapted to effect the operation of the elevator 2 through the intermediary of mechanical actuating means for the elevator 2. The actuating means for the elevator 2 comprises the cables 3 connected to opposite ends of a lever 4 rigidly fixed to the elevator 2, said cables also being connected to opposite ends of a lever 5 rigidly fixed to operating rod or shaft 6. The operating shaft 6 is normally adapted to be rotated in one direction or the other for effecting corresponding movement of the elevator 2 responsive to the radio or remote-control means 1 through the intermediary of a servomotor 7 associated with and directly controlled by the radio or remote-control means 1, the piston or plunger 8 of the servomotor 7 being associated through an adjustable link 9 with an overpower device generally designated 10 which in turn is pivotally connected to a forked bracket 11 rigidly fixed to the operating shaft 6.

Separately and alternatively operable control means, operable separate from the radio or remote-control means 1, is also provided for effecting rotation of the operating shaft 6 for actuation of the elevator 2. Said separately operable control means comprises a manual control lever or joy stick 12 fixed to a shaft 13 rotatably supported with respect to the airplane. The shaft 13 has rigidly fixed thereto a horn or lever 14 to which is pivotally connected one end of a link 15, the other end of which link 15 is pivotally connected to a horn or lever 16 rigidly fixed to the operating shaft 6.

The overpower means generally indicated by the numeral 10 constitutes a yieldable force transmitting means capable of permitting actuation of the elevator 2 by the manual control lever 12 independently of, and while the elevator 2 is generally under the control of, the automatic or radio control means 1, as will be more fully understood from the following more detailed description of said overpower means 10. Now referring to Figure 2, the overpower means 10 comprises a reaction member constituting a cylindrical housing or sleeve 20, a force transmitting member comprising the shaft or rod 21, and yieldable means interposed between the reaction member and the force transmitting member.

In the embodiment shown said yieldable means comprises a coiled spring 22 through which the rod or shaft 21 extends axially thereof. One end of the spring 22 bears against the floating abutment member 23 which is loosely mounted on the shaft 21 for longitudinal or axial movement relative thereto and the other end of said spring 22 bears against a similar floating abutment member 24 likewise loosely mounted on shaft 21 for longitudinal or axial movement relative thereto. The spring 22 is adapted to be assembled within the housing 20 intermediate the abutment members 23 and 24 the compression of the spring 22 forcing said abutment members respectively toward opposite ends of the housing 20, said abutment members 23 and 24 being retained within the housing 20 in respective positions of unidirectional stop-motion relation thereto by means of the snap rings 25 and 26, each of the latter being adapted to be seated in respective annular grooves formed at either end of the housing 20, and said rings 25 and 26 respectively engage the annular shoulders 23a and 24a of the abutment members 23 and 24 when the latter are assembled within the housing 20 in conjunction with the spring 22 under compression. Fixed abutment members 27 and 28 are adapted to be fixed on the rod 21, the abutment member 27 being pinned to said rod and abutment member 28 being threaded for cooperation with the threaded portion 21a of the rod 21 and likewise being adapted to be pinned in fixed position with respect to said rod. Each of the fixed abutment members 27 and 28 is adapted to engage one of the respective floating abutment members 23 and 24 when the latter are assembled on the rod 21 within the housing 20 in conjunction with the spring 22 under compression.

A pivot bracket 29 is provided on the housing 20 fixed thereto and includes the trunnions 30 and 30a respectively adapted for cooperation with suitable pivot openings provided in the respective forked portions of the bracket 11 fixed to the operating shaft 6 as aforesaid. The adjustable link 9 is swivelly connected to the rod 21 and internally threaded for cooperation with the threaded portion 8a of the plunger or piston 8 of the servo cylinder 7. The servo cylinder 7 is pivoted as at 35 to a suitable bracket 36 rigidly fixed to the airplane generally designated by the numeral 37.

In the operation of the control system illustrated in Figure 1, the actuation of the elevator 2, or other airplane control surface, is adapted to be normally controlled by the radio or remote-control means 1 associated with and effecting operation of the servomotor 7. Movement of the plunger or piston 8 of the servomotor 7 normally causes corresponding movement of the overpower unit 10 and consequent rotation of the operating shaft 6, the spring 22 being designed to resist movement of the rod 21 relative to the housing 20 under the conditions of normal forces required to be exerted by the servomotor 7 for actuation of the control surface 2 through the intermediate actuating means. When, however, a situation exists requiring that the human pilot riding in the target airplane take over manual control of the control surface 2, the human pilot may do so through manipulation of the manual control lever 12. Under such condition, actuation of the manual control lever 12 will serve to rotate the operating shaft 6 for actuation of the control surface 2 and the force exerted in rotation of the operating shaft 6 by the manual control means will serve to cause movement of the reaction member or sleeve 20 relative to the rod 21 in one direction or another depending upon the direction of rotation of the operating shaft 6.

It will be understood of course that the servomotor means 7 is of the type in which liquid is trapped in both ends of the cylinder on either side of the piston with which the rod 8 is connected, when the control valve is in the inoperative or neutral position, and, thus, movement of the piston and rod 8 is not possible under manual actuation of shaft 6 through manual control member 12.

Thus it will be seen that if the manipulation of the manual control lever 12 is such as to rotate the operating shaft 6 in a clockwise direction, having reference to Figure 1, the reaction member or sleeve 20 will be caused to move in a leftward direction (Figure 2) relative to the rod 21, the fixed abutment member 27, and the floating abutment member 23 engaged therewith. Such leftward movement of the member 20 will cause leftward movement of the floating abutment member 24 relative to rod 21, thereby compressing the spring 22 between the floating abutment members 23 and 24. Similarly when the manual control lever 12 is manipulated so as to rotate the shaft 6 in a counterclockwise direction, having reference to Figure 1, the reaction member or sleeve 20 will be caused to be moved in a rightward direction (Figure 2) relative to the rod 21, the fixed abutment member 28, and floating abutment member 24 engaged therewith. Such rightward movement of the member 20 will cause rightward movement of the floating abutment member 23 relative to the rod 21, thereby compressing the spring 22 between the floating abutment members 23 and 24.

It will, therefore, be seen that, under any condition of manipulation of the manual control lever 12, the reaction member or sleeve 20 will be caused to be moved relatively to the force transmitting member or rod 21 against the action of the spring 22. Consequently the overpower means 10 provides a flexible or yieldable force transmitting means capable of transmitting the required force from the servomotor to the control surface 2 for actuation of the latter, thus permitting actuation of the control surface 2 by operation of the servomotor 7 under control of the radio or remote-control means 1, under normal conditions, and said overpower device 10 is also capable of permitting the manual control means to limit or overpower the automatic radio or remote-control means through the relative motion of the housing 20 and rod 21 against the action of the spring 22 and thus effect actuation of the control surface 2, by operation of the manual control lever 12, independently of operation of the servomotor 7 and radio or remote-control means 1. It will be apparent, of course, that, on account of the interposition of the overpower means or yieldable force transmitting means 10 between the radio or remote-control means 1 and the control surface 2, the operation of the manual control means 12 will not adversely affect the operativeness of the radio or remote-control means or the intermediate operating parts.

Having thus described our invention, what we claim as new and desire to secure by Letters Patent of the United States is:

1. In a system for controlling an aircraft in flight, in combination, an aircraft control surface, actuating means therefor, servo-operating means associated with said actuating means, remote control means for controlling operation of said servo means, yieldable force transmitting means interposed between portions of the actuating means intermediate said servo means and said aircraft control surface, and manual control means directly connected with said aircraft control surface for actuation thereof independently of said servo means, said yieldable force transmitting means being normally operative to transmit controlling force from said servo means through said actuating means to said aircraft control surface for actuation of the latter, and said yieldable force transmitting means being yieldable to permit relative movement between said portions of the actuating means intermediate said aircraft control member whenever said manual control means is actuated.

2. In a system for controlling an aircraft in flight, in combination, an aircraft control surface, actuating means therefor, servo means associated with said actuating means for operating the latter, remote control means for controlling operation of said servo means, manual control means connected to said actuating means for alternatively controlling actuation thereof, and yieldable force transmitting means interposed between portions of said actuating means intermediate said servo means and the point of connection of the manual control means with said actuating means, said yieldable force transmitting means being normally operative to transmit control force from said remote control means through said actuating means to said aircraft control surface for actuation of the latter, and said yieldable force transmitting means being yieldable to permit relative movement between said portions of the actuating means intermediate said servo means and the point of connection of said manual control means with said actuating means whenever said manual control means is actuated.

3. In a system for controlling an aircraft in flight, in combination with an aircraft control surface, actuating means therefor, servo operating means associated with said actuating means, remote control means for controlling operation of said servo means, yieldable force transmitting means interposed between portions of the actuating means intermediate said servo means and said control surface, and manual control means directly connected with said aircraft control surface for actuation thereof independently of said servo means, said yieldable force transmitting means being normally operative to transmit controlling force from said servo means through said actuating means to said aircraft control surface for actuation of the latter, said yieldable force transmitting means being yieldable to permit relative movement between said portions of the actuating means intermediate the aircraft control surface whenever said manual control means is actuated and comprising a sleeve member secured to one of said portions, a rod member secured to the other portion and extending axially through the sleeve member and axially movable relative thereto, a pair of spring seat members movably mounted upon said rod for axial movement relative thereto and disposed within the sleeve member, a compression spring disposed on the rod with its opposite ends bearing on the spring seat members to urge the spring seat members apart in opposite directions relative to the rod, a removable snap ring abutment member seated in an annular groove formed in the interior of the sleeve member at each end, forming opposing abutment means limiting the movement of the spring seat members within the sleeve member away from each other under the influence of the compression spring member, and spaced abutment members secured on the rod with the spring seat members and the compression spring therebetween, each rod carried abutment member being disposed in contact with one of the spring seat members when the spring seat members are disposed in contacting engagement with the snap ring abutment member.

CHARLES L. PAULUS.
HOWARD A. KLEIN.

REFERENCES CITED

The following references are of record in the file of this patent:

UNITED STATES PATENTS

| Number | Name | Date |
| --- | --- | --- |
| 1,277,590 | Hinkler | Sept. 3, 1918 |
| 1,821,273 | Pike | Sept. 1, 1931 |
| 1,899,079 | Chater | Feb. 28, 1933 |
| 2,129,930 | Hans | Sept. 13, 1938 |
| 2,186,653 | Penote | Jan. 9, 1940 |
| 2,192,046 | Lindstrom | Feb. 27, 1940 |
| 2,227,375 | Carlson | Dec. 31, 1940 |
| 2,272,817 | Palmer | Feb. 10, 1942 |
| 2,307,781 | Holloman et al. | Jan. 12, 1943 |

FOREIGN PATENTS

| Number | Country | Date |
| --- | --- | --- |
| 7,870 | Great Britain | 1910 |